(12) United States Patent
Strubbe

(10) Patent No.: US 6,611,281 B2
(45) Date of Patent: Aug. 26, 2003

(54) SYSTEM AND METHOD FOR PROVIDING AN AWARENESS OF REMOTE PEOPLE IN THE ROOM DURING A VIDEOCONFERENCE

(75) Inventor: Hugo J. Strubbe, Yorktown Heights, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 10/014,200

(22) Filed: Nov. 13, 2001

(65) Prior Publication Data

US 2003/0090564 A1 May 15, 2003

(51) Int. Cl.$^7$ ................................................. H04N 7/14
(52) U.S. Cl. ........................... 348/14.01; 348/14.08; 348/14.05
(58) Field of Search ...................... 348/14.01–14.09, 348/14.1, 14.11, 14.12, 14.13, 169; 370/260; 709/204; 345/753

(56) References Cited

U.S. PATENT DOCUMENTS

| 3,601,530 A | 8/1971 | Edson et al. ................. 178/5.6 |
| 5,844,599 A | * 12/1998 | Hildin ..................... 348/14.08 |
| 6,108,035 A | 8/2000 | Parker et al. ............... 348/169 |

FOREIGN PATENT DOCUMENTS

| EP | 0689356 A2 | 12/1995 | ............ H04N/7/15 |
| JP | 363003589 A | * 1/1988 | ............ H04N/7/14 |
| JP | 410271475 A | * 10/1998 | ............ H04N/7/15 |
| WO | WO9960788 | 11/1999 | ............ H04N/7/14 |
| WO | WO0038414 | 6/2000 | ............ H04N/5/232 |
| WO | WO0182626 | 1/2001 | ............ H04N/7/18 |

OTHER PUBLICATIONS

S/N 09/436, Harm Belt and Cornelis Janse, "Improved Signal Localization Arrangement".

* cited by examiner

*Primary Examiner*—Melur Ramakrishnaiah
(74) *Attorney, Agent, or Firm*—Daniel J. Piotrowski

(57) ABSTRACT

A system and method are provided to track and convey the presence of all participants in video conferencing. The system is configured to generate a video locator output and an audio locator output to determine the presence of all participants. Initially, the system focuses on a person who is speaking and conveys a close-up view of that person based on the video and audio locator outputs. Thereafter, if the person speaking continues to speak or becomes silent for a predetermined time period, the system operates to adjust the camera setting to display other participants in sequence who are not speaking or zooms out the camera by a specified amount to include all participants, so that the presence, including facial expressions and reactions, of all participants can be conveyed to the remote receiving end. The system is also configured to capture a new person entering or an existing participant exiting during the course of a video conference session.

35 Claims, 5 Drawing Sheets

SYSTEM AND METHOD FOR PROVIDING AN AWARENESS OF REMOTE PEOPLE IN THE ROOM DURING A VIDEOCONFERENCE

BACKGROUND OF THE INFORMATION

1. Field of the Invention

The present invention relates generally to a multi-point communication system for establishing communication by connecting communication terminals at multiple locations, and more particularly to a method and system for relaying the presence of all participants during a video conference to a remote receiving end.

2. Description of the Related Art

Due to the advanced development of image compression coding techniques and digital communication technologies, the demand for video conferencing has grown exponentially. Various terminals have been proposed for use in video conferencing. For example, a pan-tilt-zoom (PTZ) camera mounted on top of a TV monitor is most commonly used in a conventional video conferencing setting. The operator of the PTZ controls the pan, tilt, and zoom settings of the camera to capture a close-up view of the speaker, so that remote participants at the receiving end can view the speaker's face. However, other participants who are silently present during video conferencing might never be captured in the conventional video conferencing systems. Thus, a remote person viewing the video conference may never know of their presence. However, it is often desirable to perceive the presence of other participants as they listen and interact with the speaker.

Accordingly, there is a need to provide a view of other participants in video conferencing, such that the presence of all people in the video conference can be relayed to participants at the remote receiving end.

SUMMARY OF THE INVENTION

The present invention is directed to a system and method for providing the presence of all participants in video conferencing to other video conference terminals at remote receiving ends.

According to an aspect of the present invention, a method for tracking a plurality of participants in a video conference includes the steps of: monitoring a particular video conference room to track all participants based on video locator outputs; generating an audio locator output to determine a person who is speaking; adjusting the setting of a camera to focus on a person who is speaking based on whether the audio locator and video locator outputs are within a specified range of one another; and, if the speaking person is silent for a predetermined time period, adjusting the camera setting to sequentially display other silent participants. If the speaking person continues to speak more than a predefined time period, the camera setting is adjusted to sequentially display other participants who are not speaking. The method further includes the steps of detecting and displaying a new person entering or one of the participants exiting in the video conference room.

According to another aspect of the present invention, an apparatus for tracking a plurality of participants in a video conference includes a camera, and a processor coupled to the camera and operative (i) to process an audio locator output and a video locator output indicative of the location of each participant; (ii) adjust the setting of a camera to focus on one of the participants who is speaking; (iii) detect whether the speaker is silent for a threshold time period; and, (iv) adjust the camera setting to sequentially display other participants who are not speaking after a detected period of silence exceeds the threshold time period. The processor is further operative to zoom out the camera by a predetermined amount after a detected period of silence exceeds the threshold time period.

The foregoing and other features and advantages of the invention will be apparent from the following, more detailed description of preferred embodiments as illustrated in the accompanying drawings in which reference characters refer to the same parts throughout the various views. The drawings are not necessarily to scale, the emphasis instead is placed upon illustrating the principles of the invention.

BRIEF DESCRIPTION OF THE INVENTION

A more complete understanding of the method and apparatus of the present invention is available by reference to the following detailed description when taken in conjunction with the accompanying drawings wherein.

DETAILED DESCRIPTION OF THE PREFERRED EMBODIMENTS

In the following description, for purposes of explanation rather than limitation, specific details are set forth such as the particular architecture, interfaces, techniques, etc., in order to provide a thorough understanding of the present invention. For purposes of simplicity and clarity, detailed descriptions of well-known devices, circuits, and methods are omitted so as not to obscure the description of the present invention with unnecessary detail.

Figure 1:
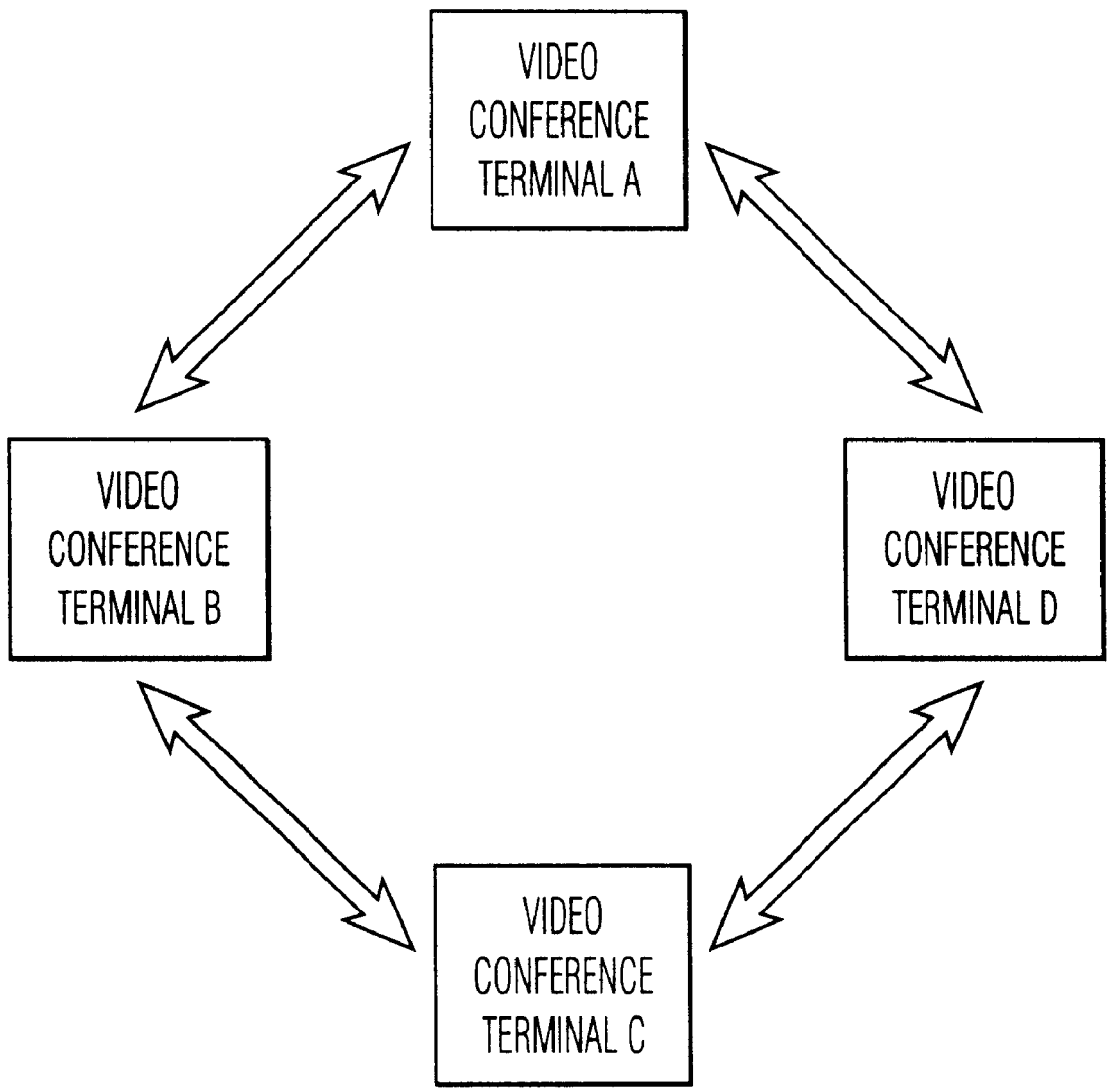
FIG. 1 is a schematic diagram illustrating a multi-point conference system according to an embodiment of the present invention.

FIG. 1 is a schematic diagram showing a plurality of terminal stations connected with each other by a digital communication line configured to perform bi-directional transmission. Namely, the video conferencing terminal A is connected to the video conferencing terminal B and the vide conference terminal D. The video conferencing terminal C is connected to the video conferencing terminal B and the video conference terminal D. Although a limited number of terminals are connected in loop shape for illustrative purposes, it is to be understood that the present invention can support concurrent video conferencing communications between a much larger number of terminals in different forms. Hence, the number of terminals and connection arrangement in the drawing should not impose limitations on the scope of the invention.

Figure 2:
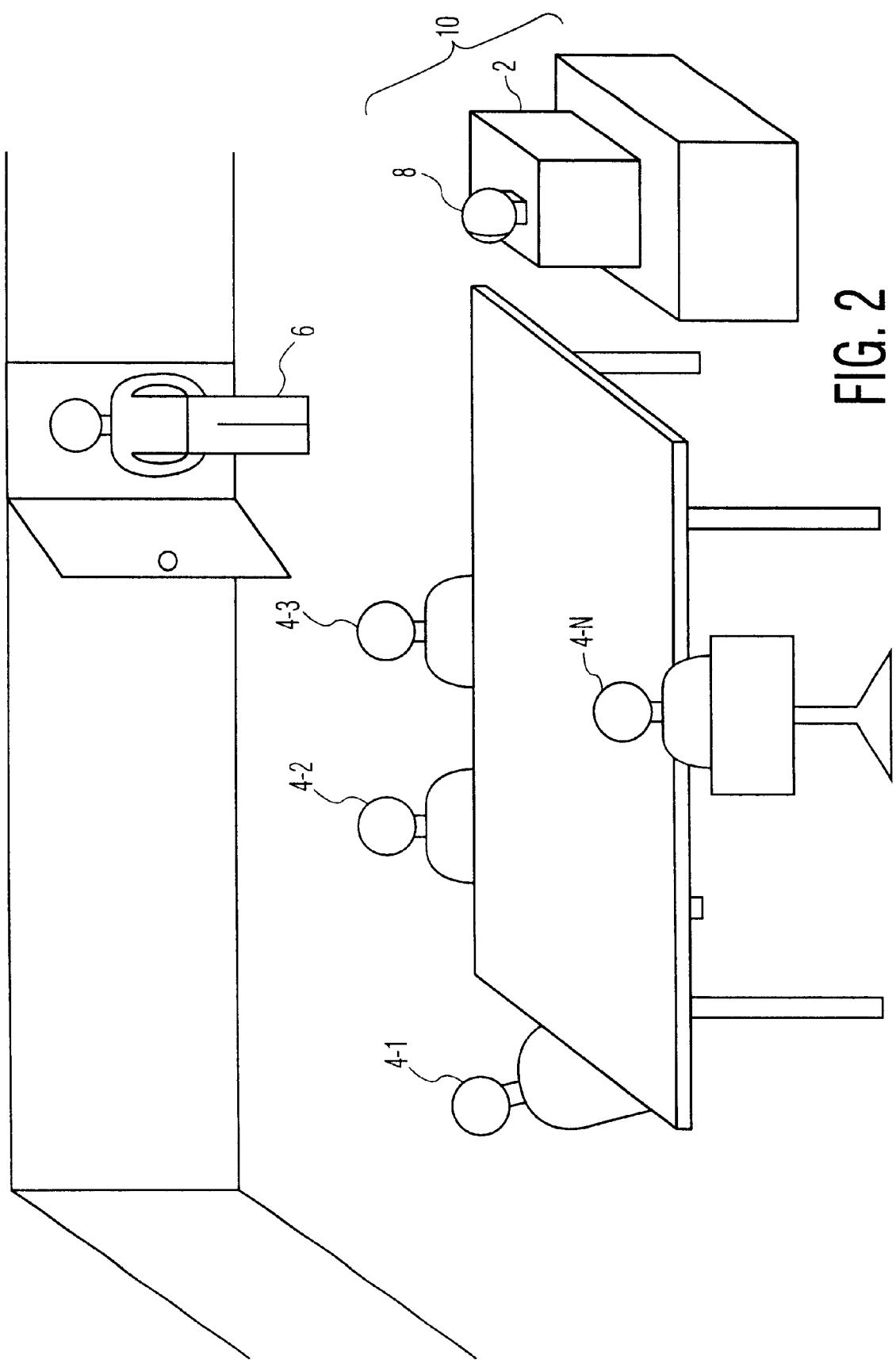
FIG. 2 is a simplified diagram of a video conference room whereto the embodiment of the present invention may be applied.
Figure 3:
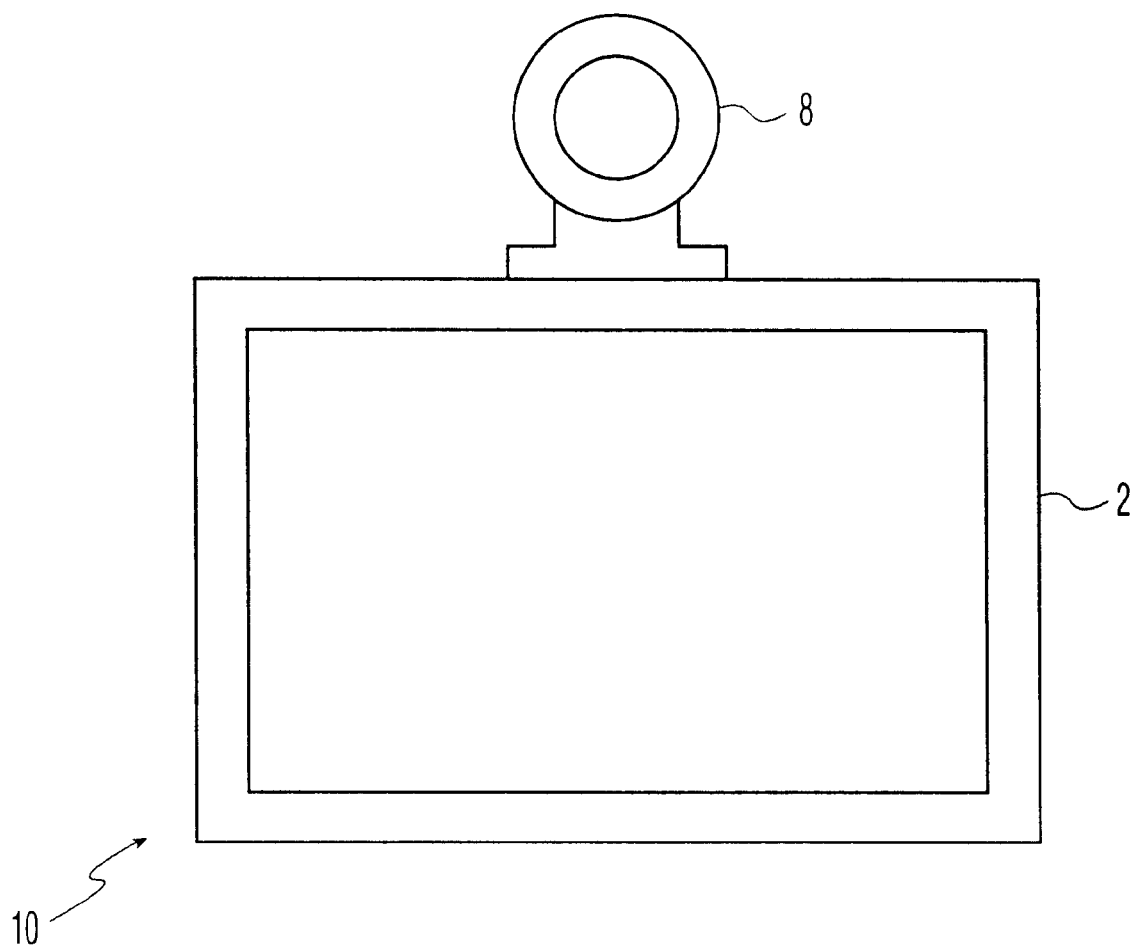
FIG. 3 is a schematic diagram showing a video conferencing system according to an embodiment of the present invention.

FIG. 2 represents a video conference taking place when multiple participants interact with remote people via the monitor 2 coupled to a video conference system 10 including a camera. The camera operating in accordance with the present invention may include a conventional pan-tilt-zoom (PTZ) camera. FIG. 3 shows the PTZ camera 8 that is mounted on the monitor 2 in accordance with the embodiment of the present invention. PTZ camera 8 is well known to those of ordinary skill in the art of video conferencing. It should be noted that a video conference system 10 within the context of this disclosure includes a lap-top computer, a conventional desktop computer, an interactive TV/set-top box remote control, or any duplex interactive devices equipped with a camera to capture the presence of participants in video conferencing.

In operation, the system 10 with a built-in automatic camera 8 and the associated software operates to relay the presence of all participants 4-1, 4-2, 4-3, . . . 4-n in a video conference room to other participants in the remote receiving end. In particular, the system 10 tracks all participants in the field of view of the camera 8 even when they are not speaking. In a normal mode, the camera 8 tracks the participants based on the flow of conversations and the movement of the participants. At appropriate times, i.e. when there is a long silence or when a person talks for a long time, the camera 8 sequentially zooms into each participant in turn. This may be alternated with full room shots or shots that minimally frame all participants. Thereafter, the camera 9 focuses back to the speaker or any other new person speaking. Meanwhile, when a new person 6 enters or exits the room, the camera 8 automatically zooms into that person for a short time. As a result, remote participants at the receiving end will be aware of where all the participants are at the sending end relative to the speaker.

Figure 4:
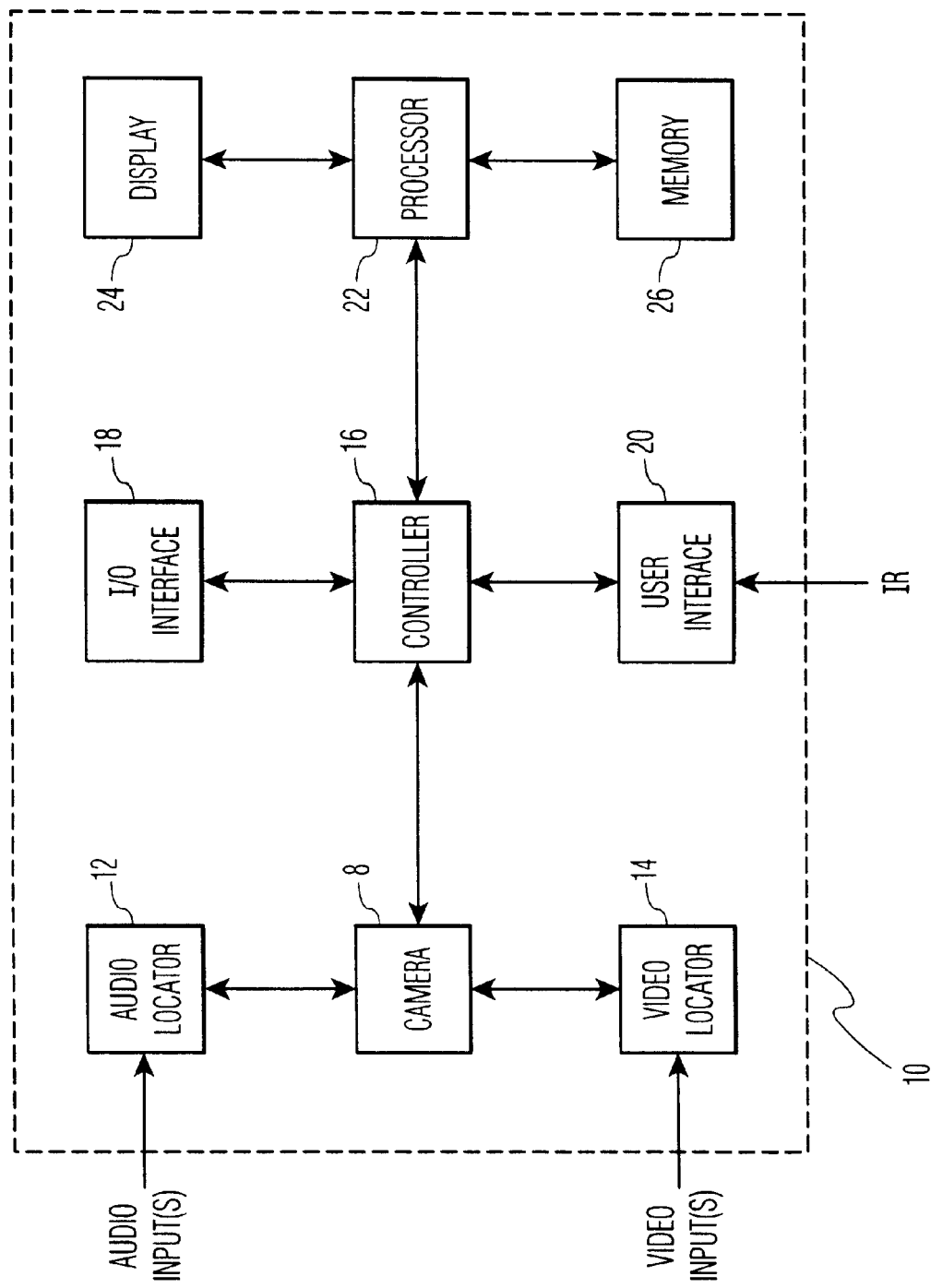
FIG. 4 is a simplified block diagram showing major components of the video conference system according to an embodiment of the present invention; and, FIG. 5 is a flow chart illustrating the operation steps according to an embodiment of the present invention.

FIG. 4 shows major components of the system 10 in accordance with the embodiment of the present invention. The system 10 includes a PTZ camera 8, an audio locator 12, a video locator 14, a controller 16, an input/output (I/O) interface 18, a user interface 20, a video processor 22, a display 24, and a memory 26.

The PTZ camera 8 is coupled to the controller 16 and operates to track one of the participants in the video conference in real time. The PTZ camera 8 is coupled to the audio locator 12 for receiving audio signals and the video locator 14 for video signals. It should be noted that other types and arrangements of connections may be used to supply video and audio signals from the camera 8 to the controller 16 or other systems that are capable of performing the tracking using a combined audio-video tracking system. In addition, other image capturing devices other than a PTZ camera can be used in accordance with the techniques of the present invention.

The audio locator 12 and video locator 14 provide audio and video tracking operations, respectively. The audio locator 12 in accordance with the present invention may be of a type described in U.S. patent application Ser. No. 09/436, 193, filed Nov. 8, 1999, the teachings of which are incorporated herein by reference. Briefly, the audio locator 12 can be used to discriminate between speakers, i.e., as a byproduct of echo cancellation. It should be noted that other types of audio locators may be used also in implementing the present invention. The video locator may be any commercially available systems well known in the art that are capable of tracking persons or other objects of interest in a video signal or other type of image signal. The output signals from the audio locator 12 and the video locator 14 are supplied to the controller 16, then processed by the processor 22 to generate one or more control signals for controlling the pan, tilt, and/or zoom settings of the camera 8.

The I/O device 18 is coupled to the controller 16 and adapted to receive a stream of video signals from the remote video conference terminals as well as other variety of sources, including a cable service provider, a digital high definition television (HDTV) and/or digital standard definition television (SDTV) signals, a satellite dish, a conventional RF broadcast, and an Internet connection. The user interface 20 is coupled to the controller 16 for receiving command signals, i.e., infrared signals, from the user to control the system 10. The display 24 is coupled to the processor 22 for receiving audio and video signals from other video conferencing terminals for viewing.

In other embodiments of the invention, some or all of the functions performed by the elements of the system 10 shown in FIG. 4 may be combined into a single device. For example, one or more of the elements of system 10 may be implemented as an application specific integrated circuits (ASIC) or circuit card to be incorporated into a computer, television, set-top box, or other processing device.

The chosen embodiment of the present invention is a computer software executing within the system 10. Computer programs (or computer control logic) are stored in the memory 26. Such computer programs, when executed, enable the system 10 to perform the function of the present invention as discussed herein.

Figure 5:
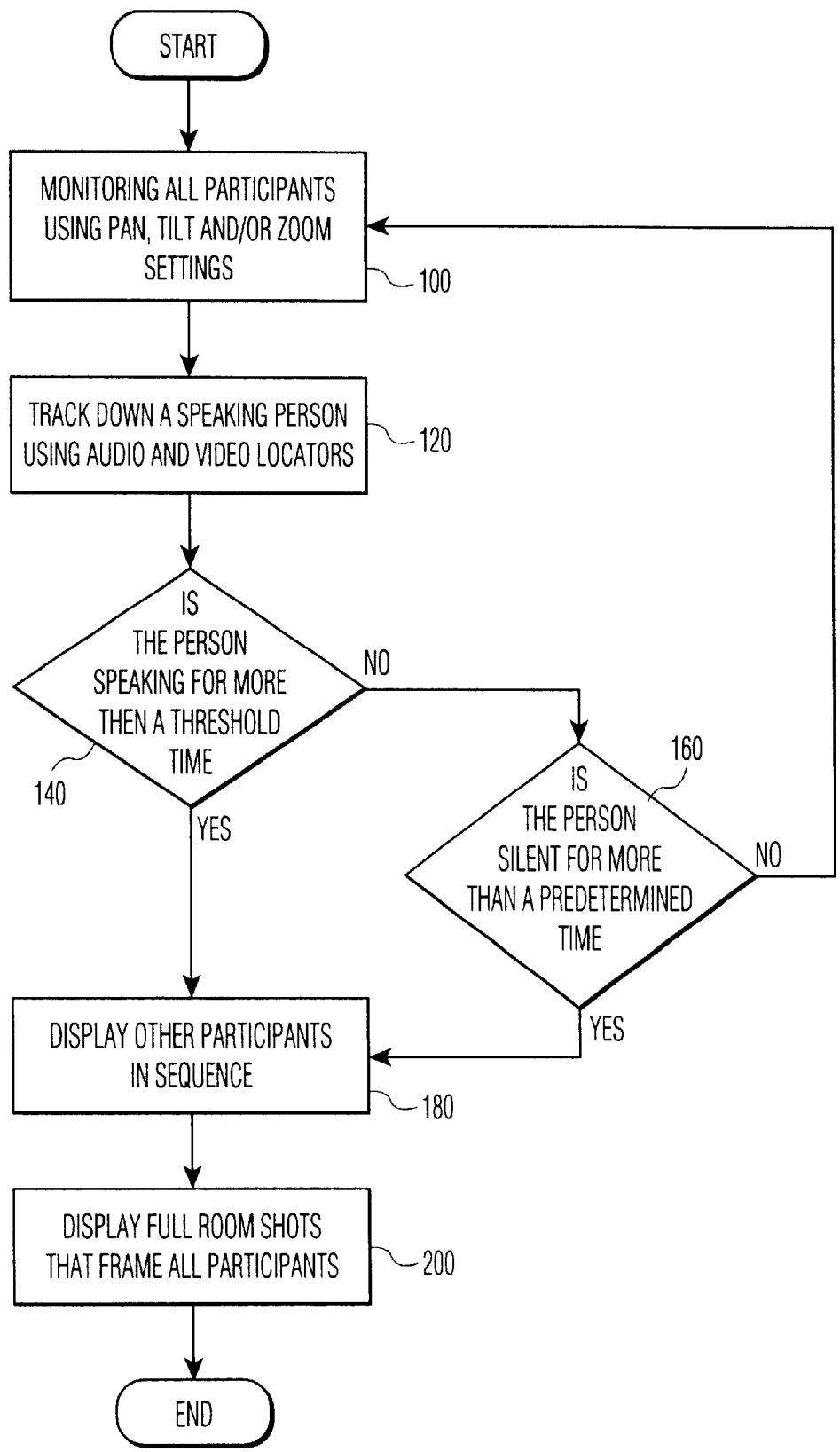

FIG. 5 shows the operation of the software embodiment of the video system 10. It is assumed that the video system 10 with the audio locator 12 and the video locator 14 are active during a given video conference. In step 100, the system 10 tracks all participants using the pan, tilt, and/or zoom settings of the camera 8. Both the audio locator 12 and the video locator 14 operate to generate tracking outputs corresponding to the presence of the participants. The tracking outputs may be in the form of, i.e., the directionality measures in degrees indicating a direction from a central axis of the camera 8 to detected participants.

In step 120, the tracking outputs from the audio locator 12 and the video locator 14 are analyzed to include an indication of the location associated with the person speaking in the room. To this end, the system 10 refers to the audio locator tracking output that sufficiently matches the video locator tracking output. For example, if directionality measures from the audio locator 12 and the video locator 14 are within a specified range of one another, i.e., within 4–5 degrees, it indicates that the audio locator 12 and the video locator 14 are sufficiently in agreement as to the location of the current speaker. When the speaker is detected, the controller 16 generates a control signal directing camera 8 to zoom into the direction of the person speaking. In the event that more than one person speaks, the audio locator 12 can locate the loudest person. The audio locator 12 described in the above-cited U.S. patent application Ser. No. 09/436,193 describes the mechanism of locating the loudest person and need not be further described.

In step 140, it is determined whether the current speaker talks for more than the threshold time period. If not, it is determined, in step 160, whether the current speaking person is silent for more than a predetermined time period. If the current speaker talks or keeps silent for a specified threshold, the system 10 sequentially displays a close-up view of the remaining participants in step 180. To achieve this, the camera settings may be adjusted based on the video locator output to control the pan, tilt, and zoom settings of the camera 8 to the direction of other participants. Thereafter, in step 200, the system 10 generates a control signal directing the camera 8 to zoom out to a certain degree or to provide a group view fully. Thereafter, the system 10 may generate a control signal directing the camera 8 to focus back to the speaker or other person who has initiated speaking.

Meanwhile, the video locator 14 continuously tries to find a new person entering the room or one of the participants leaving the room using well-known conventional techniques based on features such as motion and face color, so that the presence or absence of a person entering or leaving is conveyed to the remote participants in the receiving end.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation and the teaching of the present invention without departing from the central scope. Therefore, it is intended that the present invention not be limited to the particular embodiment disclosed as the best mode contemplated for carrying out the present invention, but that the present invention include all embodiments falling within the scope of the appended claims.

What is claimed is:

1. A method for tracking a plurality of participants in a video conference, the method comprising the steps of:
   monitoring said video conferencing to track said participants;
   generating a video locator output representing a location of each of said participants;
   generating an audio locator output to determine a person who is speaking;
   adjusting a setting of a camera based on whether said video locator output and said audio locator output are within a specified range of one another;
   if said speaker is silent for a predetermined time period, adjusting said camera setting to display other participants not speaking in sequence; and,
   detecting and displaying a new participant entering said video conference.

2. The method of claim 1, wherein if said speaking participant continually speaks for more than a predefined time period, adjusting said camera setting to sequentially display other participants not speaking.

3. The method of claim 1, further comprising the step of adjusting said camera to display all participants in said video conferencing.

4. The method of claim 1, further comprising the step of zooming out said camera by a predetermined amount if said speaking participant is silent for said predetermined time period.

5. The method of claim 1, further comprising the step of detecting a new person entering said video conferencing.

6. The method of claim 1, wherein, if said new person is detected, utilizing said video locator output to adjust said camera setting to display said new person.

7. The method of claim 1, further comprising the step of detecting one of said participants leaving said video conferencing.

8. The method of claim 7, wherein, if one of said participants is leaving, utilizing said video locator output to adjust said camera setting to display said leaving participant.

9. The method of claim 1, wherein said camera is a pan-tilt-zoom (PTZ) camera.

10. The method of claim 1, further comprising the step of returning said camera to display said speaker.

11. The method of claim 1, wherein said speaker and said other participants have a location; and wherein said detecting and displaying step further comprises continuously observing said location so as to detect and display said new participant upon said new participant's arrival at said location.

12. A method for tracking a plurality of participants in a video conference, the method comprising the steps of:
   monitoring said video conference to track said participants;
   generating a video locator output and an audio locator outputs representing a location of each of said participants;
   adjusting a setting of a camera to focus on one of said participants who is speaking;
   detecting whether said speaking participant continuously speaks for a threshold time period;
   if so, adjusting said camera setting to display other participants sequentially who are not speaking during said video conferencing; and,
   detecting and displaying a new participant entering said video conference.

13. The method of claim 12, further comprising the steps of returning said camera to display said speaker.

14. The method of claim 12, further comprising the steps of determining whether said speaking participant is silent for a predetermined time period; and,
   if so, adjusting said camera setting to sequentially display other participants after a detected period of silence exceeds said predetermined time period.

15. The method of claim 14, further comprising the step of zooming out said camera by a predetermined amount after detected period of silence exceeds said predetermined time period.

16. The method of claim 12, wherein said step of adjusting the setting of said camera when said audio locator and video locator outputs are within a specified range of one another.

17. The method of claim 12, further comprising the step of adjusting said camera to display all participants in said video conferencing.

18. The method of claim 12, further comprising the step of detecting a new person entering said video conferencing.

19. The method of claim 12, wherein, if said new person is detected, utilizing the video locator output to adjust said camera setting to display said new person.

20. The method of claim 12, further comprising the step of detecting one of said participants leaving said video conferencing.

21. The method of claim 20, wherein, if one of said participants is leaving, utilizing the video locator output to adjust said camera setting to display said leaving participant.

22. The method of claim 12, wherein said camera is a pan-tilt-zoom (PTZ) camera.

23. An apparatus for tracking a plurality of participants in a video conferencing, comprising:
   a camera;
   a processor coupled to said camera and operative (i) to process an audio locator output and a video locator output indicative of the location of each participant, (ii) adjust the setting of a camera to focus on one of said participants who is speaking; (iii) detect whether said speaking participant is silent for a threshold time period; (iv) adjust said camera setting to sequentially display other participants who are not speaking after a detected period of silence exceeds said threshold time period; and, (v) detect and display a new participant entering said video conference.

24. The apparatus of claim 23, wherein said processor is further operative to zoom out said camera by a predetermined amount after the detected period of silence exceeds said threshold time period.

25. The apparatus of claim 23, wherein said camera is focused on said speaker if said audio locator and video locator outputs are within a specified range of one another.

26. The apparatus of claim 23, wherein said processor is further operative to adjust said camera to display all participants after the detected period of silence exceeds said threshold time period.

27. The apparatus of claim 23, wherein said processor is further operative to detect a new person entering said video conferencing.

28. The apparatus of claim 23, wherein said processor is further operative to utilize said video locator output to adjust said camera setting to capture said new person.

29. The apparatus of claim 23, wherein said processor is further operative to detect one of said participants leaving said video conferencing.

30. The apparatus of claim 29, wherein said processor is further operative to utilize the video locator output to adjust said camera setting to display said leaving participant.

31. The apparatus of claim 23, wherein said camera is a pan-tilt-zoom (PTZ) camera.

32. The apparatus of claim 23, wherein said processor is further operative to adjust said camera setting to sequentially display other participants who are not speaking if said speaking participant continues to speak for more than said threshold time period.

33. The method of claim 32, further comprising the step of returning said camera to display said speaker.

34. The apparatus of claim 32, wherein said processor is further operative to zoom out said camera by a predetermined amount if said speaking participant continues to speak for more than said threshold time period.

35. The apparatus of claim 34, wherein said processor is further operative to adjust said camera to display all participants if said speaking participant continues to speak for more than said threshold time period.

* * * * *